United States Patent Office 3,286,780
Patented Nov. 22, 1966

3,286,780
FLEXIBLE SKIRT WITH CHAINS FOR AIR
CUSHION BORNE VEHICLES
Grahame George Yates, Wiltshire, England, assignor to
Vickers-Armstrongs (Engineers) Limited, London, England, a British company
Filed Mar. 13, 1964, Ser. No. 351,783
Claims priority, application Great Britain, Apr. 22, 1963,
15,867/63
7 Claims. (Cl. 180—7)

This invention relates to air cushion borne vehicles.

According to the present invention there is provided a vehicle adapted to be borne at least partially on an air cushion, wherein a flexible skirt depends from the underside of the vehicle body for minimising leakage of air laterally from the cushion, there being chains depending from the underside of the vehicle body co-operating with said skirt for restraining outward movement of the latter under the influence of pressure of air in the cushion.

Figure 1:
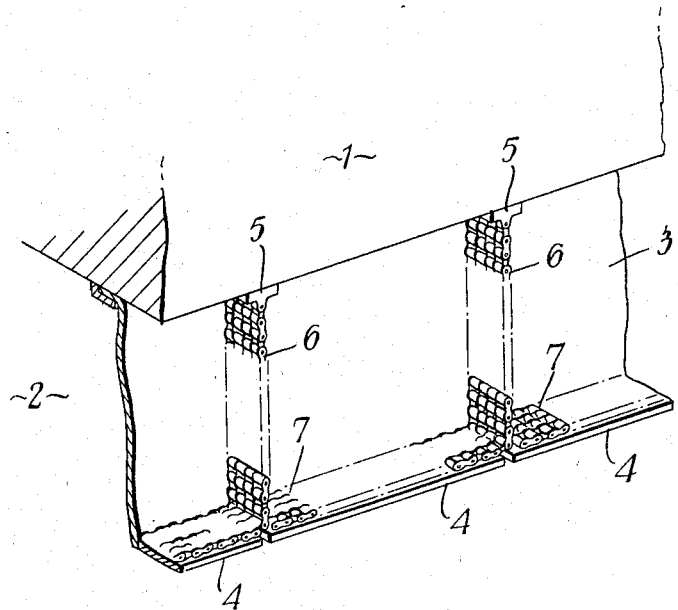
Figure 2:
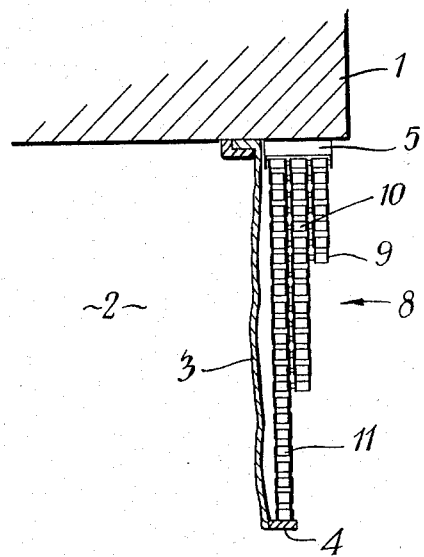
Figure 3:
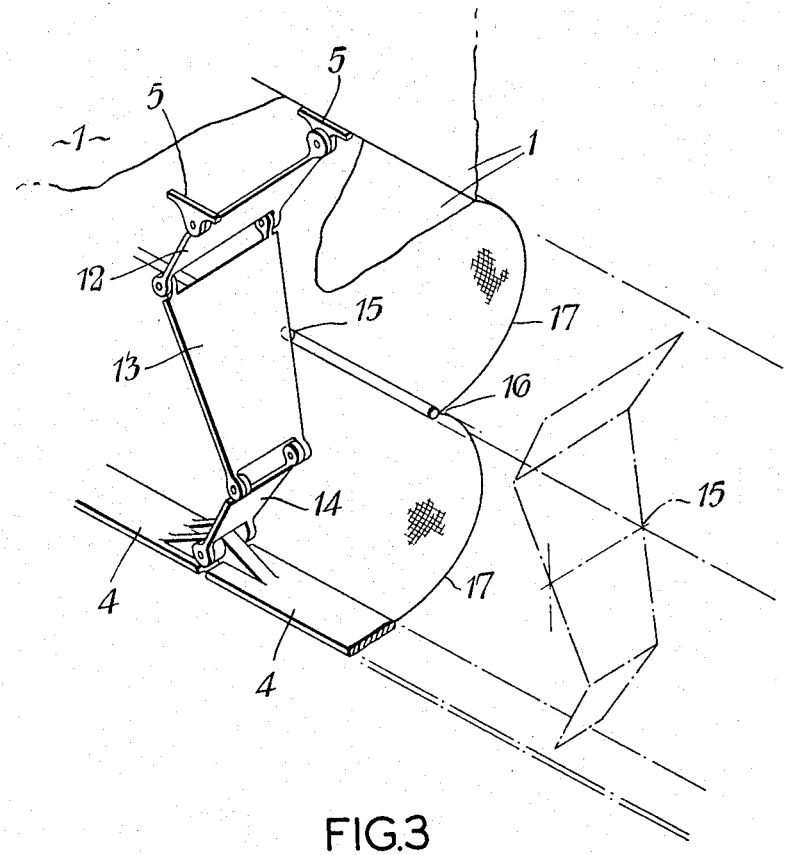

For a better understanding of the present invention and to show how the same may be carried into effect, reference will not be made, by way of example, to the accompanying drawings, in which:

FIGURE 1 is a partly sectioned diagrammatic perspective view of part of an air-cushion borne vehicle, FIGURE 2 is a diagrammatic transverse sectional view of part of another air-cushion borne vehicle, and FIGURE 3 is a diagrammatic partly sectional perspective view of a part of a further air-cushion borne vehicle.

All the vehicles referred to herein are of the kind that are adapted to be supported at least partially by an air cushion formed on the underside thereof, the cushion being supplied with air through an opening or openings in the underside of the vehicle body and there being a skirt depending from the peripheral part of the underside of the vehicle body for encircling the cushion and minimising leakage of air from the cushion to the surrounding atmosphere.

The vehicles of FIGURE 1 has a body 1 that rides on an air cushion 2, the latter being confined laterally by a skirt 3 of flexible material depending from the peripheral part of the underside of the body 1. Shoes 4 in the form of rectangular plates are attached to the bottom of the skirt 3, each plate being substantially horizontal and being disposed on the outside of the skirt 3. Brackets 5 are fixed at intervals around the underside of the vehicle body 1 outside the skirt 3, each bracket 5 lying above a gap between a pair of adjacent shoes 4. Roller quadruplex chains 6 are attached to the brackets 5 to depend vertically therefrom. Horizontal roller quadruplex chains 7 join the bottom links of each adjacent pair of chains 6 and lie on the shoes 4 to which they are attached. The axes of the rollers of the chains 6 are substantially horizontal and perpendicular to the adjacent side of the vehicle so that the chains 6 can only fold up substantially parallel to this side and cannot readily be distorted outwardly of the vehicle body 1.

When the vehicle is supported on the cushion 2, outward movement of the skirt 3 resulting from cushion pressure on the skirt 3 is resisted by the chains 6 which maintain the skirt 3 substantially vertical. However, the chains 6 allow vertical movement of the shoes 4, if necessary for the full depth of the skirt 3.

The size of each chain, its width and length, and the spacing of the brackets 5 are selected dependent upon the cushion pressures employed and the depth of skirt required. In the vehicles of FIGURE 1, the chains 6 are quadruplex chains, but it will be understood that the chains can be simple, or duplex, or triplex chains or have more than four rows.

In FIGURE 2 part of a vehicle with a modified form of chain is shown. Chains 8 are suspended from the underside of the vehicle body 1 in a similar manner to the chains 6 of the vehicle of FIGURE 1, the upper part 9 of each chain 8 being triplex, the middle part 10 duplex, and the lower part 11 being simple. Shoes 4 are attached to the bottom of the skirt 3 and to horizontally extending chains as in the vehicle shown in FIGURE 1. If desired the shoes may be dispensed with and a skirt and chain arrangement such as that shown in FIGURES 1 or 2 omitting the shoes 4 and the horizontally extending chains 7 may be employed. However, the shoes 4 connecting the bottoms of adjacent chains will smooth a path for the bottoms of the chains as they follow the surface over which the vehicle is traveling, and prevent the chains from snagging on obstacles. The shoes 4 will assist in transmitting vertical movement from a forward chain to a rearward chain, as the forward chain passes over an obstacle since when this happens, the rearward chain is already raised as it approaches the obstacle. Furthermore, the skirt 3 need not be attached to the bottom of the chain 6 or 8.

In a further modification (not shown), the skirt is arranged to depend from the periphery of the underside of the vehicle body outside the chains, the latter being within the air cushion and the skirts being attached to these chains at least at the bottom thereof. These chains may be of a form such as those shown in FIGURE 1 or 2 and may be with or without shoes. When the vehicle is supported on its air cushion the chains hold the skirt, which is urged outwardly by the air cushion, substantially vertical. The skirt may be flat and connected to each chain by a series of vertically spaced wires. Another form of skirt which may be employed is one which is formed with a series of horizontal folds with inwardly extending horizontal ridges, each ridge being attached at each point opposite a chain to that chain by a wire. In use of a vehicle employing such a folded skirt, whenever the bottom of the skirt encounters an obstruction the lowermost parts of the chains are slackened and also fold up, the weight of the lowermost parts reopening the lowermost fold when the obstruction is cleared. If a larger obstruction is encountered, several of the lowermost folds will be closed and a correspondingly greater length of chain slackened.

Instead of employing chains graded in the manner shown in FIGURE 2 into three parts 9, 10 and 11, a link assembly such as that shown in FIGURE 3 may be provided. The link assembly has three link members 12, 13 and 14 of trapezoidal shape, the upper link member 12 being pivotally supported from brackets 5 attached to the underside of the periphery of the vehicle body with its longer parallel edge uppermost. The assembly tapers towards the bottom where shoes 4 are pivotally attached at the bottom edge of the lower link member 14. The pivotal axes of each link assembly are perpendicular to the adjacent side of the vehicle. The distance between the parallel edges of the middle link member 13 is twice that of the distance between the parallel edges of each of the link members 12 and 14, so that the mid-point 15 of one side of the middle link member 13 moves only vertically when the assembly retracts or expands in the vertical direction while forming a "Z." A central fold 16 of a doubly convoluted skirt 17 projects inwardly and may be attached at the point 15 to the link member 13. Such attachment, which may be achieved by a swivellable fastening (not shown), will prevent the fold of the skirt blowing outwardly under the influence of the cushion pressure. The folds of the convoluted skirt extend longitudinally of the skirt and may be reinforced by a wire (not shown) or bars (not shown). The concave sides of the folds face towards the link members and the cushion. The skirt 17 is suspended from the underside periphery of the vehicle body 1 and encloses an air cushion and the link assemblies, the bottom edge of the skirt being attached to the shoes 4. When the shoes 4 are lifted relative to the vehicle body 1 to retract the link assembly, the point 15 and the fold 16 rise by an amount that is half that of the rise of the shoes 4, and the convolutions of the skirt 17 bulge further outwardly with respect to the air cushion.

It will be understood that the link members 12 to 14 need not be graded in width and that any number greater than one of link members may be joined together to form a collapsible chain in combination with a skirt having any number of convolutions.

I claim:

1. An air cushion vehicle comprising a vehicle body, there being an air cushion space under said body, a flexible skirt depending from the underside of the body for minimising leakage of air laterally from said space, and chains depending from the underside of the vehicle body at spaced locations along the flexible skirt, said chains and skirt engaging each other at said locations, each chain comprising a plurality of link members connected in series from the vehicle body down to the lower portion of the flexible skirt and being foldable vertically but laterally rigid in a direction perpendicular to the general direction of the skirt adjacent that chain, said chains co-operating with said skirt for restraining outward movement of the latter under the influence of pressure of air in the cushion.

2. A vehicle according to claim 1, wherein the link members are of trapezoidal shape and pivotally and sequentially connected together at their parallel edges, the link members of each chain being graded in size to form a downwardly tapering chain.

3. A vehicle according to claim 1, wherein the chains are disposed within the air cushion and are attached to the skirt at least at the bottom thereof.

4. A vehicle according to claim 1, and further ocmprising shoes joining the bottoms of adjacent chains.

5. An air cushion borne vehicle comprising a vehicle body, there being an air cushion space under said body, a flexible skirt depending from the underside of the body for minimizing leakage of air laterally from said space, and laterally rigid chains depending from the underside of the vehicle body at spaced locations along and disposed outside the flexible skirt with respect to the air cushion space, said chains and skirt engaging each other at said locations and co-operating with each other for restraining outward movement of the skirt under the influence of the pressure of air in the air cushion space.

6. An air cushion borne vehicle comprising a vehicle body, there being an air cushion space under said body, a flexible skirt depending from the underside of the body for minimizing leakage of air laterally from said space, and chains depending from the underside of the vehicle body at spaced locations along the flexible skirt, said chains and skirt engaging each other at said locations, said chains being roller chains, the axes of the rollers of which are substantially horizontal and arranged perpendicular to the adjacent side of the vehicle, and said chains co-operating with said skirt for restraining outward movement of the latter under the influence of the pressure of air in the air cushion space.

7. A vehicle according to claim 6, wherein the upper part of each chain has a plurality of rows and wherein the lower part has a lesser number of rows than the upper part.

References Cited by the Examiner

UNITED STATES PATENTS

| 3,078,940 | 2/1963 | Rolle | 180—7 |
| 3,082,836 | 3/1963 | Billman | 180—7 |
| 3,172,494 | 3/1965 | Cockerell | 180—7 |
| 3,219,135 | 11/1965 | Bunting et al. | 180—7 |

BENJAMIN HERSH, *Primary Examiner.*

LEO FRIAGLIA, *Examiner.*

M. S. SALES, *Assistant Examiner.*